United States Patent
Chae

(10) Patent No.: US 11,796,037 B2
(45) Date of Patent: Oct. 24, 2023

(54) POWER TRANSMISSION APPARATUS OF ELECTRIC VEHICLE

(71) Applicants: Hyundai Motor Company, Seoul (KR); Kia Corporation, Seoul (KR)

(72) Inventor: Minho Chae, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/708,906

(22) Filed: Mar. 30, 2022

(65) Prior Publication Data

US 2023/0184310 A1    Jun. 15, 2023

(30) Foreign Application Priority Data

Dec. 9, 2021 (KR) .......................... 10-2021-0175334

(51) Int. Cl.
*F16H 3/00* (2006.01)
*F16H 3/093* (2006.01)
*F16H 61/04* (2006.01)

(52) U.S. Cl.
CPC ............. *F16H 3/006* (2013.01); *F16H 3/093* (2013.01); *F16H 61/0403* (2013.01)

(58) Field of Classification Search
CPC .... F16H 3/006; F16H 2003/008; F16H 3/093; F16H 61/0403; F16H 2200/0008; F16H 2200/0013; F16H 2200/0017; F16H 3/001; F16H 3/08; F16H 2003/0815; F16H 3/085; F16H 3/095
See application file for complete search history.

(56) References Cited

U.S. PATENT DOCUMENTS

| | | | |
|---|---|---|---|
| 5,188,574 A * | 2/1993 | Echigo .................. | B60K 17/08 475/221 |
| 6,793,604 B2 * | 9/2004 | Kobayashi ............. | F16H 3/089 74/335 |
| 10,591,036 B2 * | 3/2020 | Matsuura .............. | F16H 57/038 |
| 2015/0300470 A1 * | 10/2015 | Märkl .................. | F16H 37/046 475/207 |

FOREIGN PATENT DOCUMENTS

EP           3121483 A1 *  1/2017  ............. F16H 3/006

* cited by examiner

*Primary Examiner* — Bobby Rushing, Jr.
(74) *Attorney, Agent, or Firm* — MORGAN, LEWIS & BOCKIUS LLP

(57) ABSTRACT

A power transmission apparatus of an electric vehicle includes a motor shaft fixed to a drive motor and receiving the torque of the drive motor, a first input shaft disposed on a same axis with and selectively connectable to the motor shaft, a second input shaft coaxially disposed with the first input shaft, and selectively connectable to the motor shaft, front and rear wheel driving devices for driving front and wheels, a first shifting section for shifting a torque of the first input shaft and selectively transmit the shifted torque to the front wheel driving device, a second shifting section for shifting a torque of the second input shaft and selectively output the shifted torque, and a mode conversion unit of transferring an output torque of the second shifting section to at least one of the front wheel driving device and the rear wheel driving device.

18 Claims, 4 Drawing Sheets

FIG. 2

| Operational chart | | C1 | C2 | S1 | S2 | S3 |
|---|---|---|---|---|---|---|
| Front-wheel drive | 1st | 0 | | ← | Neutral | ← |
| Front-wheel drive | 2nd | | 0 | Neutral | ← | ← |
| Front-wheel drive | 3rd | 0 | | → | Neutral | ← |
| Front-wheel drive | 4th | | 0 | Neutral | → | ← |
| Rear-wheel drive | 1st | | 0 | Neutral | ← | → |
| Rear-wheel drive | 2nd | | 0 | Neutral | → | → |
| Four-wheel drive | Front-wheel 1st + rear-wheel 1st | 0 | 0 | ← | ← | → |
| Four-wheel drive | Front-wheel 3rd + rear-wheel 3rd | 0 | 0 | → | → | → |

FIG. 4

| Operational chart | | C1 | C2 | S1 | S2 | S3 |
|---|---|---|---|---|---|---|
| Front-wheel drive | 1st | 0 | | ← | Neutral | → |
| Front-wheel drive | 2nd | | 0 | Neutral | ← | → |
| Front-wheel drive | 3rd | 0 | | → | Neutral | → |
| Front-wheel drive | 4th | | 0 | Neutral | → | → |
| Rear-wheel drive | 1st | | 0 | Neutral | ← | ← |
| Rear-wheel drive | 2nd | | 0 | Neutral | → | ← |
| Four-wheel drive | Front-wheel 1st + rear-wheel 1st | 0 | 0 | ← | ← | ← |
| Four-wheel drive | Front-wheel 3rd + rear-wheel 3rd | 0 | 0 | → | → | ← |

POWER TRANSMISSION APPARATUS OF ELECTRIC VEHICLE

CROSS-REFERENCE TO RELATED APPLICATION

The present application claims priority to Korean Patent Application No. 10-2021-0175334 filed on Dec. 9, 2021, the entire contents of which is incorporated herein for all purposes by this reference.

BACKGROUND OF THE PRESENT DISCLOSURE

Field of the Present Disclosure

The present disclosure relates to a power transmission apparatus of an electric vehicle.

Description of Related Art

An environment-friendly technology of a vehicle is a core technology which controls survival of a future vehicle industry, and advanced vehicle makers have focused their energy on the development of an environment-friendly vehicle to achieve environmental and fuel efficiency regulations.

As an example of such environment-friendly vehicles, an electric vehicle is found in the market, which is not provided with an internal combustion engine but utilizes an electric motor to drive the vehicle.

Examples of the electric vehicles may be a battery electric vehicle that drives by electricity stored in a battery, a fuel cell electric vehicle that drives by electricity generated by fuel, and the like.

In the present disclosure, the term "electric vehicle" is intended to mean a vehicle that drives by a drive motor without employing an internal combustion engine, for example, a battery electric vehicle, a fuel cell vehicle, and the like.

Various merits may be achieved when a multi-stage shifting apparatus is provided to an electric vehicle. For example, with the multi-stage shifting apparatus, a starting torque of the electric vehicle by the drive motor may be increased, and a smaller capacity motor may be used to output the same drive torque. Therefore, a production cost of the electric vehicle may be decreased, and electric efficiency may be improved because the drive motor may be operated at efficient driving point.

Meanwhile, when provided with a multi-stage shifting apparatus, a vehicle weight and a production cost may increase, and therefore, a multi-stage shifting apparatus having a simple structure may be beneficial.

Furthermore, the necessity and advantages (e.g., rough road escape, off-road performance, and the like) of the four-wheel drive also work for the electric vehicle, and therefore, vehicle behavior and marketability of the electric vehicle may be enhanced by power transmission apparatus configured for efficiently achieving the four-wheel drive.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a power transmission apparatus of an electric vehicle configured for efficiently achieving a front-wheel drive mode, a rear-wheel drive mode, and a four-wheel drive mode.

A power transmission apparatus of an electric vehicle transfers a torque of a drive motor to at least one of a front wheel and a rear wheel. The power transmission apparatus includes a motor shaft fixedly connected to the drive motor and configured to receive the torque of the drive motor, a first input shaft disposed on a same axis with the motor shaft and selectively connectable to the motor shaft, a second input shaft formed in a hollow shaft, coaxially disposed with the first input shaft, disposed on a same axis with the motor shaft, and selectively connectable to the motor shaft, a front wheel driving device configured to drive the front wheel, a rear wheel driving device configured to drive the rear wheel, a first shifting section configured to shift a torque of the first input shaft and selectively transmit the shifted torque of the first input shaft to the front wheel driving device, a second shifting section configured to shift a torque of the second input shaft and selectively output the shifted torque, and a mode conversion unit configured to transfer an output torque of the second shifting section to at least one of the front wheel driving device and the rear wheel driving device.

The first shifting section may include a first speed drive gear and a third speed drive gear that are fixed on the first input shaft and formed with different radii, a first intermediate shaft disposed apart from and in parallel with the first input shaft, a first speed driven gear and a third speed driven gear that are rotatably mounted on the first intermediate shaft, and gear-engaged with the first speed drive gear and the third speed drive gear, respectively, a first synchronizer configured to selectively connect the first intermediate shaft to the first speed driven gear or the third speed driven gear, and a first transfer drive gear configured to transfer an output torque of the first shifting section to the front wheel driving device.

The second shifting section may include a second speed drive gear and a fourth speed drive gear that are fixed on the second input shaft and formed with different radii, a second intermediate shaft disposed apart from and in parallel with the second input shaft, a second speed driven gear and a fourth speed driven gear that are rotatably mounted on the second intermediate shaft, and gear-engaged with the second speed drive gear and the fourth speed drive gear, respectively, and a second synchronizer configured to selectively connect the second intermediate shaft to the second speed driven gear or the fourth speed driven gear.

The mode conversion unit may include a front wheel transfer drive gear rotatably mounted on an output shaft of the second shifting section and gear-engaged with the front wheel driving device, a rear wheel transfer drive gear rotatably mounted on the output shaft of the second shifting section and gear-engaged with the rear wheel driving device, and a torque connection device configured to selectively connect the output shaft of the second shifting section to one of the front wheel transfer drive gear and the rear wheel transfer drive gear.

The torque connection device may include a dog clutch disposed on the output shaft of the second shifting section, and including a sleeve configured to operate along the output shaft of the second shifting section. The dog clutch may be configured to, according to an operation of the sleeve, connect the output shaft of the second shifting section to the front wheel transfer drive gear, or connect the output shaft of the second shifting section to the rear wheel transfer drive gear.

The front wheel driving device may include a front wheel output shaft configured to transfer a drive torque of the front wheel output shaft to the front wheel, and a front wheel transfer driven gear fixed on the front wheel output shaft. The rear wheel driving device may include a rear wheel output shaft configured to transfer a drive torque of the rear wheel output shaft to the rear wheel, and a rear wheel transfer driven gear fixed on the rear wheel output shaft.

A power transmission apparatus of an electric vehicle may further include a first clutch configured to selectively connect the motor shaft and the first input shaft, and a second clutch configured to selectively connect the motor shaft and the second input shaft.

A plurality of front-wheel drive mode shifting stages, a plurality of rear-wheel drive mode shifting stages, and a plurality of four-wheel drive mode shifting stages may be achieved according to operations of the first clutch, the second clutch, the first shifting section, the second shifting section, and the mode conversion unit.

The mode conversion unit may be disposed in a same direction with the drive motor with reference to the second shifting section.

The mode conversion unit may be disposed in an opposite direction of the drive motor with reference to the second shifting section.

A power transmission apparatus of an electric vehicle transfers a torque of a drive motor to at least one of a front wheel and a rear wheel. The power transmission apparatus includes a motor shaft fixedly connected to the drive motor and configured to receive the torque of the drive motor, a first input shaft disposed on a same axis with the motor shaft, selectively connectable to the motor shaft, and fixedly provided with a first speed drive gear and a third speed drive gear having different radii, a second input shaft formed in a hollow shaft and coaxially disposed with the first input shaft, disposed on a same axis with the motor shaft, selectively connectable to the motor shaft, and fixedly provided with a second speed drive gear and a fourth speed drive gear having different radii, a first intermediate shaft which is disposed apart from and in parallel with the first input shaft, and on which a first speed driven gear and a third speed driven gear gear-engaged with the first speed drive gear and the third speed drive gear are rotatably disposed, a second intermediate shaft which is disposed apart from and in parallel with the second input shaft, and on which a second speed driven gear and a fourth speed driven gear gear-engaged with the second speed drive gear and the fourth speed drive gear are rotatably disposed, a front wheel output shaft fixedly provided with a front wheel transfer driven gear and configured to drive the front wheel, a rear wheel output shaft fixedly provided with a rear wheel transfer driven gear and configured to drive the rear wheel, a first transfer drive gear fixed on the first intermediate shaft and gear-engaged with the front wheel transfer driven gear, a front wheel transfer drive gear rotatably mounted on the second intermediate shaft and gear-engaged with the front wheel transfer driven gear, and a rear wheel transfer drive gear rotatably mounted on the second intermediate shaft and gear-engaged with the rear wheel transfer driven gear.

A power transmission apparatus of an electric vehicle may further include a first clutch configured to selectively connect the motor shaft and the first input shaft, a second clutch configured to selectively connect the motor shaft and the second input shaft, a first synchronizer configured to selectively connect the first intermediate shaft to the first speed driven gear or the third speed driven gear, a second synchronizer configured to selectively connect the second intermediate shaft to the second speed driven gear or the fourth speed driven gear, and a dog clutch disposed on the second intermediate shaft, and configured to selectively connect the second intermediate shaft to one of the front wheel transfer drive gear and the rear wheel transfer drive gear.

The dog clutch may include a sleeve configured to operate along the second intermediate shaft. The dog clutch may be configured to, according to an operation of the sleeve, connect the second intermediate shaft to the front wheel transfer drive gear, or connect the second intermediate shaft to the rear wheel transfer drive gear.

A front-wheel drive mode, a four-wheel drive mode, and a rear-wheel drive mode may be achieved according to operations of the first clutch, the second clutch, the first synchronizer, the second synchronizer, and the dog clutch.

The front-wheel drive mode may include at least four front-wheel drive mode shifting stages. The rear-wheel drive mode may include at least two rear-wheel drive mode shifting stages. The four-wheel drive mode may include at least two four-wheel drive mode shifting stages.

In each of the at least two four-wheel drive mode shifting stages, a rotation speed applied to the front wheel may be equal to a rotation speed applied to the rear wheel.

The dog clutch may be disposed in a same direction with the drive motor with reference to the second synchronizer.

The dog clutch may be disposed in an opposite direction of the drive motor with reference to the second synchronizer.

According to an exemplary embodiment of the present disclosure, the front-wheel drive mode, the rear-wheel drive mode, and the four-wheel drive mode may be efficiently achieved, and multi-stage shifting may be realized in each drive mode.

Furthermore, according to an exemplary embodiment of the present disclosure, the slip loss of clutches may be minimized in the four-wheel drive mode.

Other effects which may be obtained or are predicted by an exemplary embodiment will be explicitly or implicitly described in a detailed description of the present disclosure. That is, various effects that are predicted according to an exemplary embodiment will be described in the following detailed description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2 is an operation chart of a power transmission apparatus of an electric vehicle according to a first exemplary embodiment of the present disclosure.

FIG. 4 is an operation chart of a power transmission apparatus of an electric vehicle according to a second exemplary embodiment of the present disclosure.

Figure 1:
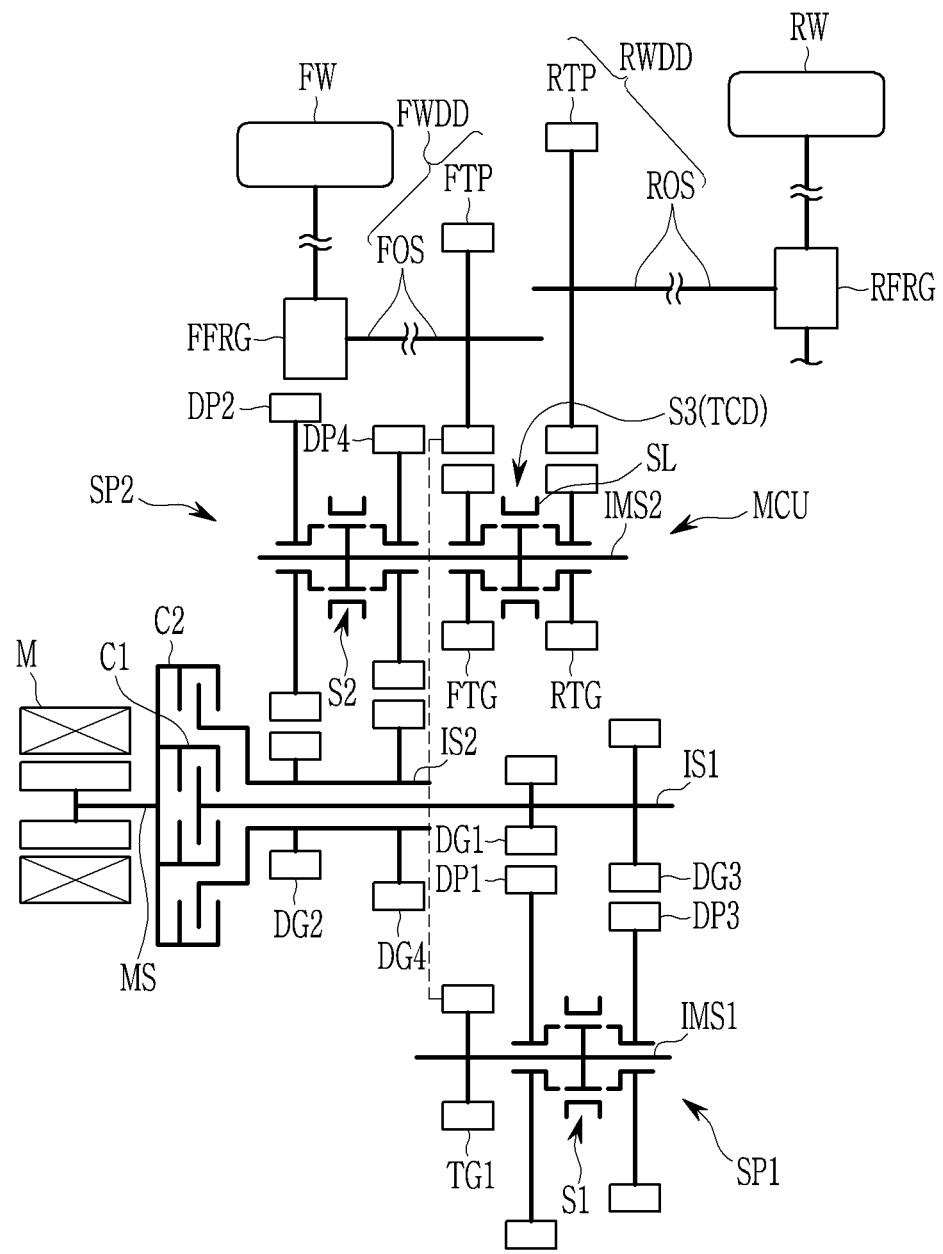
FIG. 1 is a schematic diagram of a power transmission apparatus of an electric vehicle according to a first exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the exemplary embodiment will be described in detail with reference to the accompanying drawings. In the exemplary embodiment, the same or similar components will be denoted by the same or similar reference numerals, and a repeated description thereof will be omitted.

In describing exemplary embodiments of the present specification, when it is determined that a detailed description of the well-known art associated with the present disclosure may obscure the gist of the present disclosure, it will be omitted. The accompanying drawings are provided only to allow exemplary embodiments included in the present specification to be easily understood and are not to be interpreted as limiting the spirit included in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be directly connected or directly coupled to the other component or may be connected or coupled to the other component with a further component intervening therebetween. Furthermore, it is to be understood that when one component is referred to as being "directly connected" or "directly coupled" to another component, it may be directly connected or directly coupled to the other component without a further component intervening therebetween.

It will be further understood that terms "comprise" and "have" used in the present specification specify the presence of stated features, numerals, steps, operations, components, parts, or combinations thereof, but do not preclude the presence or addition of one or more other features, numerals, steps, operations, components, parts, or combinations thereof.

As used herein, the singular forms are intended to include the plural forms as well, unless the context clearly indicates otherwise. As used herein, the term "and/or" includes any one or all combinations of one or more related items.

In the present disclosure, the term "motor" is intended to mean a motor-generator that performs functions of a motor and a generator, unless stated to the contrary.

An exemplary embodiment of the present disclosure is hereinafter described in detail with reference to the drawings.

In the following description, the flow of power is described mainly from the viewpoint of driving the electric vehicle, but it may be understood that the power may flow in the opposite direction as described, for example, in the regenerative braking, and the like.

FIG. 1 is a schematic diagram of a power transmission apparatus of an electric vehicle according to a first exemplary embodiment of the present disclosure.

A power transmission apparatus of an electric vehicle according to a first exemplary embodiment shifts a torque of a drive motor M as a power source and transfers the shifted torque to at least one of a front wheel FW and a rear wheel RW.

Referring to FIG. 1, a power transmission apparatus according to a first exemplary embodiment includes a motor shaft MS, a first input shaft IS1, a second input shaft IS2, a front wheel driving device FWDD, a rear wheel driving device RWDD, a first shifting section SP1, a second shifting section SP2, and a mode conversion unit MCU.

The motor shaft MS is fixedly connected to the drive motor M, to receive the torque of the drive motor M.

The first input shaft IS1 is disposed on a same axis with the motor shaft MS, and selectively connectable to the motor shaft MS. The motor shaft MS and the first input shaft IS1 are selectively connectable to each other through a first clutch C1.

The second input shaft IS2 is formed in a hollow shaft and coaxially disposed with the first input shaft IS1, and disposed on a same axis with the motor shaft MS and selectively connectable to the motor shaft MS. The motor shaft MS and the second input shaft IS2 are selectively connectable to each other through a second clutch C2.

The front wheel driving device FWDD is configured to drive the front wheel FW. The front wheel driving device FWDD includes a front wheel output shaft FOS configured to transfer a drive torque to the front wheel FW, and a front wheel transfer driven gear FTP fixed on the front wheel output shaft FOS.

The rear wheel driving device RWDD is configured to drive the rear wheel RW. The rear wheel driving device RWDD includes a rear wheel output shaft ROS configured to transfer a drive torque to the rear wheel RW, and a rear wheel transfer driven gear RTP fixed on the rear wheel output shaft ROS.

The first shifting section SP1 is configured to shift a torque of the first input shaft IS1 and selectively transmit the shifted torque to the front wheel driving device FWDD.

In more detail, the first shifting section SP1 includes a first speed drive gear DG1, a first speed driven gear DP1, a third speed drive gear DG3, a third speed driven gear DP3, a first intermediate shaft IMS1, a first synchronizer S1, and a first transfer drive gear TG1.

The first speed drive gear DG1 and the third speed drive gear DG3 are fixed on the first input shaft IS1 and formed with different radii.

The first intermediate shaft IMS1 is disposed apart from and in parallel with the first input shaft IS1. The first speed driven gear DP1 and the third speed driven gear DP3 are rotatably mounted on the first intermediate shaft IMS1, and externally gear-meshed with the first speed drive gear DG1 and the third speed drive gear DG3, respectively.

The first synchronizer S1 is configured to selectively connect the first intermediate shaft IMS1 to the first speed driven gear DP1 or the third speed driven gear DP3. The first transfer drive gear TG1 is configured to transfer an output torque of the first shifting section SP1 to the front wheel driving device FWDD.

The second shifting section SP2 is configured to shift a torque of the second input shaft IS2 and selectively output the shifted torque.

In more detail, the second shifting section SP2 includes a second speed drive gear DG2, a second speed driven gear DP2, a fourth speed drive gear DG4, a fourth speed driven gear DP4, a second intermediate shaft IMS2, and a second synchronizer S2.

The second speed drive gear DG2 and the fourth speed drive gear DG4 are fixed on the second input shaft IS2 and formed with different radii. The second intermediate shaft IMS2 is disposed apart from and in parallel with the second input shaft IS2. The second speed driven gear DP2 and the fourth speed driven gear DP4 are rotatably mounted on the second intermediate shaft IMS2, and externally gear-meshed with the second speed drive gear DG2 and the fourth speed drive gear DG4, respectively. The second synchronizer S2 is configured to selectively connect the second intermediate shaft IMS2 to the second speed driven gear DP2 or the fourth speed driven gear DP4.

The first synchronizer S1 and the second synchronizer S2 may be formed in a known configuration and is not described in further detail, and it may be understood that their sleeves may be operated by a separate actuator.

The mode conversion unit MCU is configured to transfer an output torque of the second shifting section SP2 to at least one of the front wheel driving device FWDD and the rear wheel driving device RWDD.

In more detail, the mode conversion unit MCU includes a front wheel transfer drive gear FTG, a rear wheel transfer drive gear RTG, and a torque connection device TCD.

The front wheel transfer drive gear FTG is rotatably mounted on an output shaft (the same as the second intermediate shaft IMS2 in an exemplary embodiment of the present disclosure) of the second shifting section SP2, and externally gear-meshed with the front wheel driving device FWDD. The rear wheel transfer drive gear RTG is rotatably mounted on the output shaft of the second shifting section SP2, and externally gear-meshed with the rear wheel driving device RWDD. The torque connection device TCD is configured to selectively connect the output shaft of the second shifting section SP2 to one of the front wheel transfer drive gear FTG and the rear wheel transfer drive gear RTG.

In more detail, the torque connection device TCD includes a dog clutch S3 which is disposed on the output shaft of the second shifting section SP2, and includes a sleeve SL configured to operate along the output shaft of the second shifting section SP2.

The dog clutch S3 is formed as a clutch facilitating torque transmission through teeth engagement, and accordingly, power delivery efficiency may be enhanced, and an overall length of a transmission may be decreased compared with using synchronizers or typical wet-type clutches.

The dog clutch S3 is configured to, according to an operation of the sleeve SL, connect the output shaft of the second shifting section SP2 to the front wheel transfer drive gear FTG, or connect the output shaft of the second shifting section SP2 to the rear wheel transfer drive gear RTG.

That is, the sleeve SL of the dog clutch S3 may be positioned at left, middle, and right positions in the drawing.

When the sleeve SL of the dog clutch S3 is positioned at the left position in the drawing, the second intermediate shaft IMS2 is connected to the front wheel transfer drive gear FTG but not to the rear wheel transfer drive gear RTG. In the instant state, a torque of the second intermediate shaft IMS2 is transferred only to the front wheel FW, facilitating a front-wheel drive mode.

When the sleeve SL of the dog clutch S3 is positioned at the right position in the drawing, the second intermediate shaft IMS2 is connected to the rear wheel transfer drive gear RTG but not to the front wheel transfer drive gear FTG. In the instant state, the torque of the second intermediate shaft IMS2 is transferred only to the rear wheel RW. Therefore, in the instant state in the instant state, a rear-wheel drive mode is enabled. On the other hand, because the first transfer drive gear TG1 of the first shifting section SP1 is externally gear-meshed with the front wheel transfer driven gear FTP, a four-wheel drive mode may also be achieved when the output torque of the first shifting section SP1 is transferred to the front wheel transfer driven gear FTP through the first transfer drive gear TG1.

Meanwhile, when the sleeve SL of the dog clutch S3 is positioned at the middle position in the drawing, which means a neutral position, the second intermediate shaft IMS2 is connected to none of the front wheel transfer drive gear FTG and the rear wheel transfer drive gear RTG. The present state may be understood as an interim position of mode conversion, for example, from the front-wheel drive mode to the rear-wheel drive mode or the four-wheel drive mode or vice versa.

The configuration of a power transmission apparatus of an electric vehicle according to a first exemplary embodiment of the present disclosure may be reviewed based on detailed constituent elements. That is, a power transmission apparatus of an electric vehicle according to a first exemplary embodiment includes the motor shaft MS, the first input shaft IS1, the second input shaft IS2, the first intermediate shaft IMS1, the second intermediate shaft IMS2, the front wheel output shaft FOS, and the rear wheel output shaft ROS.

The motor shaft MS is fixedly connected to the drive motor M, to receive the torque of the drive motor M.

The first input shaft IS1 is disposed on a same axis with the motor shaft MS and selectively connectable to the motor shaft MS. The first speed drive gear DG1 and the third speed drive gear DG3 having different radii are fixed on the first input shaft IS1.

The second input shaft IS2 is formed in a hollow shaft and coaxially disposed with the first input shaft IS1, disposed on a same axis with the motor shaft MS, and selectively connectable to the motor shaft MS. The second speed drive gear DG2 and the fourth speed drive gear DG4 having different radii are fixed on the second input shaft IS2.

The first intermediate shaft IMS1 is disposed apart from and in parallel with the first input shaft IS1, the first speed driven gear DP1 and the third speed driven gear DP3 externally gear-meshed with the first speed drive gear DG1 and the third speed drive gear DG3, respectively, are rotatably disposed first intermediate shaft IMS1.

The second intermediate shaft IMS2 is disposed apart from and in parallel with the second input shaft IS2, and the second speed driven gear DP2 and the fourth speed driven gear DP4 externally gear-meshed with the second speed drive gear DG2 and the fourth speed drive gear DG4, respectively, are rotatably mounted on second intermediate shaft IMS2.

The front wheel output shaft FOS is configured to drive the front wheel FW. The front wheel output shaft FOS is connected to the front wheel FW through a front wheel final reduction gear FFRG configured to transfer a decreased rotation speed of the front wheel output shaft FOS to the front wheel FW.

Meanwhile, the front wheel transfer driven gear FTP is fixed on the front wheel output shaft FOS to receive the torque.

The rear wheel output shaft ROS is configured to drive the rear wheel RW. The rear wheel output shaft ROS is connected to the rear wheel RW through a rear wheel final reduction gear RFRG configured to transfer a decreased rotation speed of the rear wheel output shaft ROS to the rear wheel RW.

Meanwhile, the rear wheel transfer driven gear RTP is fixed on the rear wheel output shaft ROS to receive the torque Furthermore, a power transmission apparatus of an electric vehicle according to a first exemplary embodiment further includes the first transfer drive gear TG1, the front wheel transfer drive gear FTG, and the rear wheel transfer drive gear RTG. The first transfer drive gear TG1 is fixed on the first intermediate shaft IMS1, and externally gear-meshed with the front wheel transfer driven gear FTP. The front wheel transfer drive gear FTG is rotatably mounted on the second intermediate shaft IMS2, and externally gear-meshed with the front wheel transfer driven gear FTP. The rear wheel transfer drive gear RTG is rotatably mounted on the second intermediate shaft IMS2, and externally gear-meshed with the rear wheel transfer driven gear RTP.

As operational elements for operating the mechanical configuration of the power transmission apparatus, a power transmission apparatus of an electric vehicle according to a first exemplary embodiment includes the first clutch C1, the second clutch C2, the first synchronizer S1, the second synchronizer S2, and the dog clutch S3.

The first clutch C1 is configured to selectively connect the motor shaft MS and the first input shaft IS1. The second clutch C2 is configured to selectively connect the motor shaft MS and the second input shaft IS2. The first synchronizer S1 is configured to selectively connect the first intermediate shaft IMS1 to the first speed driven gear DP1 or the third speed driven gear DP3. The second synchronizer S2 is configured to selectively connect the second intermediate shaft IMS2 to the second speed driven gear DP2 or the fourth speed driven gear DP4. The dog clutch S3 is disposed on the second intermediate shaft IMS2, and configured to selectively connect the second intermediate shaft IMS2 to one of the front wheel transfer drive gear FTG and the rear wheel transfer drive gear RTG.

In more detail, the dog clutch S3 includes the sleeve SL configured to operate along the second intermediate shaft IMS2.

The dog clutch S3 is configured to, according to an operation of the sleeve SL, connect the second intermediate shaft IMS2 to the front wheel transfer drive gear FTG (when the sleeve SL moves to the left in the drawing), or connect the second intermediate shaft IMS2 to the rear wheel transfer drive gear RTG (when the sleeve SL moves to the right in the drawing).

For the detailed configuration and operation of the dog clutch S3, refer to the above description.

Referring to FIG. 1, in a power transmission apparatus of an electric vehicle according to a first exemplary embodiment of the present disclosure, the mode conversion unit MCU is disposed in a same direction with the drive motor M with reference to the second shifting section SP2. In other words, in a power transmission apparatus of an electric vehicle according to a first exemplary embodiment of the present disclosure, the dog clutch S3 is disposed in a same direction with the drive motor M with reference to the second synchronizer S2.

In such a configuration, referring to FIG. 1, the rear wheel transfer drive gear RTG and the rear wheel transfer driven gear RTP is disposed in an opposite direction of the drive motor M with reference to the front wheel transfer drive gear FTG and the front wheel transfer driven gear FTP.

According to such an arrangement, a drive torque for the front wheel FW is transferred in the same direction with the drive motor M (to the left in the drawing), and a drive torque for the rear wheel RW is transferred in the opposite direction of the drive motor M (to the right in the drawing).

A power transmission apparatus of an electric vehicle according to an exemplary embodiment of the present disclosure is configured for achieving the front-wheel drive mode, the four-wheel drive mode, and the rear-wheel drive mode, according to operations of the first clutch C1, the second clutch C2, the first synchronizer S1, the second synchronizer S2, and the dog clutch S3.

The front-wheel drive mode includes at least four front-wheel drive mode shifting stages. The rear-wheel drive mode includes at least two rear-wheel drive mode shifting stages. The four-wheel drive mode includes at least two four-wheel drive mode shifting stages.

In other words, according to a power transmission apparatus of an electric vehicle according to an exemplary embodiment of the present disclosure, a plurality of front-wheel drive mode shifting stages, a plurality of rear-wheel drive mode shifting stages, and a plurality of four-wheel drive mode shifting stages are achieved according to operations of the first clutch C1, the second clutch C2, the first shifting section SP1, the second shifting section SP2, and the mode conversion unit MCU.

Each shifting-stage implemented in each of these drive modes will be described in more detail later.

Meanwhile, in the four-wheel drive mode, a rotation speed of the front wheel FW is required to be the same with a rotation speed of the rear wheel RW. Therefore, in an exemplary embodiment of the present disclosure, in each of the at least two four-wheel drive mode shifting stages, gear ratios are designed so that the rotation speed applied to the front wheel FW is the same with the rotation speed applied to the rear wheel RW. This will be described later while describing the operation of the four-wheel drive mode.

Hereinafter, respective drive modes and each shifting stage achieved by a power transmission apparatus according to an exemplary embodiment are described in detail with reference to FIG. 2.

First, the front-wheel drive mode is described. In the front-wheel drive mode, the dog clutch S3 is disposed to the left position in the drawing.

[Front-Wheel Drive Mode—First Speed]

In the front-wheel drive mode first speed, the dog clutch S3 is disposed to the left position in the drawing, the first clutch C1 is operated, and the first synchronizer S1 is operated to the left in the drawing.

Because the dog clutch S3 is disposed to the left position in the drawing, the rear wheel output shaft ROS of the rear wheel driving device RWDD does not receive a drive torque.

Because the first clutch C1 is operated, the torque of the drive motor M is transferred to the first input shaft IS1. At the instant time, because the first synchronizer S1 is operated to the left in the drawing, the first intermediate shaft IMS1 is connected to the first speed driven gear DP1.

Accordingly, the torque of the first input shaft IS1 is transferred to the front wheel output shaft FOS through the first speed drive gear DG1, the first speed driven gear DP1, the first intermediate shaft IMS1, the first transfer drive gear TG1, and the front wheel transfer driven gear FTP.

The overall gear ratio of the front-wheel drive mode first speed is determined based on a gear ratio between the first speed driven gear DP1 and the first speed drive gear DG1, a gear ratio between the first transfer drive gear TG1 and the front wheel transfer driven gear FTP, and a front wheel final reduction ratio (i.e., the gear ratio of the front wheel final reduction gear FFRG).

[Front-Wheel Drive Mode—Second Speed]

In the front-wheel drive mode second speed, the dog clutch S3 is disposed to the left position in the drawing, the second clutch C2 is operated, and the second synchronizer S2 is operated to the left in the drawing.

Because the dog clutch S3 is disposed to the left position in the drawing, the rear wheel output shaft ROS of the rear wheel driving device RWDD does not receive a drive torque. On the other hand, the torque of the second intermediate shaft IMS2 may be transferred to the front wheel transfer driven gear FTP through the front wheel transfer drive gear FTG.

Because the second clutch C2 is operated, the torque of the drive motor M is transferred to the second input shaft IS2. At the instant time, because the second synchronizer S2 is operated to the left in the drawing, the second intermediate shaft IMS2 is connected to the second speed driven gear DP2.

Accordingly, the torque of the second input shaft IS2 is transferred to the front wheel output shaft FOS through the second speed drive gear DG2, the second speed driven gear DP2, the second intermediate shaft IMS2, the front wheel transfer drive gear FTG, and the front wheel transfer driven gear FTP.

The overall gear ratio of the front-wheel drive mode second speed is determined based on a gear ratio between the second speed driven gear DP2 and the second speed drive gear DG2, a gear ratio between the front wheel transfer drive gear FTG and the front wheel transfer driven gear FTP, and the front wheel final reduction ratio (i.e., the gear ratio of the front wheel final reduction gear FFRG).

[Front-Wheel Drive Mode—Third Speed]

In the front-wheel drive mode third speed, the dog clutch S3 is disposed to the left position in the drawing, the first clutch C1 is operated, and the first synchronizer S1 is operated to the right in the drawing.

Because the dog clutch S3 is disposed to the left position in the drawing, the rear wheel output shaft ROS of the rear wheel driving device RWDD does not receive a drive torque.

Because the first clutch C1 is operated, the torque of the drive motor M is transferred to the first input shaft IS1. At the instant time, because the first synchronizer S1 is operated to the right in the drawing, the first intermediate shaft IMS1 is connected to the third speed driven gear DP3.

Accordingly, the torque of the first input shaft IS1 is transferred to the front wheel output shaft FOS through the third speed drive gear DG3, the third speed driven gear DP3, the first intermediate shaft IMS1, the first transfer drive gear TG1, and the front wheel transfer driven gear FTP.

The overall gear ratio of the front-wheel drive mode third speed is determined based on a gear ratio between the third speed driven gear DP3 and the third speed drive gear DG3, the gear ratio between the first transfer drive gear TG1 and the front wheel transfer driven gear FTP, and the front wheel final reduction ratio (i.e., the gear ratio of the front wheel final reduction gear FFRG).

[Front-Wheel Drive Mode—Fourth Speed]

In the front-wheel drive mode fourth speed, the dog clutch S3 is disposed to the left position in the drawing, the second clutch C2 is operated, and the second synchronizer S2 is operated to the right in the drawing.

Because the dog clutch S3 is disposed to the left position in the drawing, the rear wheel output shaft ROS of the rear wheel driving device RWDD does not receive a drive torque. On the other hand, the torque of the second intermediate shaft IMS2 may be transferred to the front wheel transfer driven gear FTP through the front wheel transfer drive gear FTG.

Because the second clutch C2 is operated, the torque of the drive motor M is transferred to the second input shaft IS2. At the instant time, because the second synchronizer S2 is operated to the right in the drawing, the second intermediate shaft IMS2 is connected to the fourth speed driven gear DP4.

Accordingly, the torque of the second input shaft IS2 is transferred to the front wheel output shaft FOS through the fourth speed drive gear DG4, the fourth speed driven gear DP4, the second intermediate shaft IMS2, the front wheel transfer drive gear FTG, and the front wheel transfer driven gear FTP.

The overall gear ratio of the front-wheel drive mode fourth speed is determined based on a gear ratio between the fourth speed driven gear DP4 and the fourth speed drive gear DG4, and the front wheel final reduction ratio (i.e., the gear ratio of the front wheel final reduction gear FFRG).

[Rear-Wheel Drive Mode—First Speed]

In the front-wheel drive mode first speed, the dog clutch S3 is disposed to the right position in the drawing, the first clutch C1 is not operated, the second clutch C2 is operated, and the second synchronizer S2 is operated to the left in the drawing.

Because the dog clutch S3 is disposed to the right position in the drawing, the front wheel output shaft FOS of the front wheel driving device FWDD does not receive a drive torque from the second intermediate shaft IMS2. On the other hand, the torque of the second intermediate shaft IMS2 may be transferred to the rear wheel transfer driven gear RTP through the rear wheel transfer drive gear RTG.

Because the first clutch C1 is not operated, the torque of the drive motor M is not transferred to the first input shaft IS1, and therefore, the first shifting section SP1 does not contribute to formation of the drive torque of the vehicle.

Because the second clutch C2 is operated, the torque of the drive motor M is transferred to the second input shaft IS2. At the instant time, because the second synchronizer S2 is operated to the left in the drawing, the second intermediate shaft IMS2 is connected to the second speed driven gear DP2.

Accordingly, the torque of the second input shaft IS2 is transferred to the rear wheel output shaft ROS through the second speed drive gear DG2, the second speed driven gear DP2, the second intermediate shaft IMS2, the rear wheel transfer drive gear RTG, and the rear wheel transfer driven gear RTP.

The overall gear ratio of the rear-wheel drive mode first speed is determined based on the gear ratio between the second speed driven gear DP2 and the second speed drive gear DG2, a gear ratio between the rear wheel transfer drive gear RTG and the rear wheel transfer driven gear RTP, and a rear wheel final reduction ratio (i.e., the gear ratio of the rear wheel final reduction gear RFRG).

[Rear-Wheel Drive Mode—Second Speed]

In the front-wheel drive mode second speed, the dog clutch S3 is disposed to the right position in the drawing, the first clutch C1 is not operated, the second clutch C2 is operated, and the second synchronizer S2 is operated to the right in the drawing.

Because the dog clutch S3 is disposed to the right position in the drawing, the front wheel output shaft FOS of the front wheel driving device FWDD does not receive a drive torque from the second intermediate shaft IMS2. On the other hand, the torque of the second intermediate shaft IMS2 may be transferred to the rear wheel transfer driven gear RTP through the rear wheel transfer drive gear RTG.

Because the first clutch C1 is not operated, the torque of the drive motor M is not transferred to the first input shaft IS1, and therefore, the first shifting section SP1 does not contribute to formation of the drive torque of the vehicle.

Because the second clutch C2 is operated, the torque of the drive motor M is transferred to the second input shaft IS2. At the instant time, because the second synchronizer S2 is operated to the right in the drawing, the second intermediate shaft IMS2 is connected to the fourth speed driven gear DP4.

Accordingly, the torque of the second input shaft IS2 is transferred to the rear wheel output shaft ROS through the fourth speed drive gear DG4, the fourth speed driven gear DP4, the second intermediate shaft IMS2, the rear wheel transfer drive gear RTG, and the rear wheel transfer driven gear RTP.

The overall gear ratio of the rear-wheel drive mode second speed is determined based on the gear ratio between the fourth speed driven gear DP4 and the fourth speed drive gear DG4, the gear ratio between the rear wheel transfer drive gear RTG and the rear wheel transfer driven gear RTP, and the rear wheel final reduction ratio (i.e., the gear ratio of the rear wheel final reduction gear RFRG).

[Four-Wheel Drive Mode—First Speed]

In the four-wheel drive mode first speed, the dog clutch S3 is disposed to the right position in the drawing, both the first clutch C1 and the second clutch C2 are operated, and both the first synchronizer S1 and the second synchronizer S2 are operated to the left in the drawing.

Because the dog clutch S3 is disposed to the right position in the drawing, the front wheel output shaft FOS of the front wheel driving device FWDD does not receive a drive torque from the second intermediate shaft IMS2. On the other hand, the torque of the second intermediate shaft IMS2 may be transferred to the rear wheel transfer driven gear RTP through the rear wheel transfer drive gear RTG.

Because both of the first clutch C1 and the second clutch C2 are operated, the torque of the drive motor M is transferred to both of the first input shaft IS1 and the second input shaft IS2. Furthermore, it may be understood that the slip loss of the first clutch C1 and the second clutch C2 may be minimized because both of the first clutch C1 and the second clutch C2 are operated.

Because the first synchronizer S1 is operated to the left in the drawing, the first intermediate shaft IMS1 is connected to the first speed driven gear DP1. Accordingly, the torque of the first input shaft IS1 is transferred to the front wheel output shaft FOS through the first speed drive gear DG1, the first speed driven gear DP1, the first intermediate shaft IMS1, the first transfer drive gear TG1, and the front wheel transfer driven gear FTP.

Meanwhile, because the second synchronizer S2 is operated to the left in the drawing, the second intermediate shaft IMS2 is connected to the second speed driven gear DP2. Accordingly, the torque of the second input shaft IS2 is transferred to the rear wheel output shaft ROS through the second speed drive gear DG2, the second speed driven gear DP2, the second intermediate shaft IMS2, the rear wheel transfer drive gear RTG, and the rear wheel transfer driven gear RTP.

Referring to the above operation, in the four-wheel drive mode first speed, the front wheel FW receives a rotation speed of the front-wheel drive mode first speed, and the rear wheel RW receives a rotation speed of the rear-wheel drive mode first speed.

Meanwhile, in the four-wheel drive mode, the rotation speed of the front wheel FW is required to be the same with the rotation speed of the rear wheel RW. Therefore, in an exemplary embodiment of the present disclosure, in each of the at least two four-wheel drive mode shifting stages, the rotation speed applied to the front wheel FW is formed equal to the rotation speed applied to the rear wheel RW, as described above.

As described above, the overall gear ratio of the front-wheel drive mode first speed is determined based on the gear ratio between the first speed driven gear DP1 and the first speed drive gear DG1, the gear ratio between the first transfer drive gear TG1 and the front wheel transfer driven gear FTP, and the front wheel final reduction ratio (i.e., the gear ratio of the front wheel final reduction gear FFRG).

Furthermore, the overall gear ratio of the rear-wheel drive mode first speed is determined based on the gear ratio between the second speed driven gear DP2 and the second speed drive gear DG2, the gear ratio between the rear wheel transfer drive gear RTG and the rear wheel transfer driven gear RTP, and the rear wheel final reduction ratio (i.e., the gear ratio of the rear wheel final reduction gear RFRG).

Therefore, gear ratios may be set so that the product of all of the gear ratio between the first speed driven gear DP1 and the first speed drive gear DG1, the gear ratio between the first transfer drive gear TG1 and the front wheel transfer driven gear FTP, and the front wheel final reduction ratio (i.e., the gear ratio of the front wheel final reduction gear FFRG) is equal to the product of all of the gear ratio between the second speed driven gear DP2 and the second speed drive gear DG2, the gear ratio between the rear wheel transfer drive gear RTG and the rear wheel transfer driven gear RTP, and the rear wheel final reduction ratio (i.e., the gear ratio of the rear wheel final reduction gear RFRG). By such a setting of gear ratios, the rotation speeds of the front wheel FW and the rear wheel RW may become equal to each other the four-wheel drive mode first speed. Specific gear ratios may be set by the designer in accordance with the designer's intention and/or design constraints.

Therefore, each gear ratio may be set so that the product of all the first gear ratio, the second gear ratio, and the front wheel final reduction ratio is equal to the product of all the third gear ratio, the rear wheel transfer gear ratio, and the rear wheel final reduction ratio.

[Four-Wheel Drive Mode—Second Speed]

In the four-wheel drive mode second speed, the dog clutch S3 is disposed to the right position in the drawing, both the first clutch C1 and the second clutch C2 are operated, and the first synchronizer S1 and both the second synchronizer S2 are operated to the right in the drawing.

Because the dog clutch S3 is disposed to the right position in the drawing, the front wheel output shaft FOS of the front wheel driving device FWDD does not receive a drive torque from the second intermediate shaft IMS2. On the other hand, the torque of the second intermediate shaft IMS2 may be transferred to the rear wheel transfer driven gear RTP through the rear wheel transfer drive gear RTG.

Because both of the first clutch C1 and the second clutch C2 are operated, the torque of the drive motor M is transferred to both of the first input shaft IS1 and the second input shaft IS2. Furthermore, it may be understood that the slip loss of the first clutch C1 and the second clutch C2 may be minimized because both of the first clutch C1 and the second clutch C2 are operated.

Because the first synchronizer S1 is operated to the right in the drawing, the first intermediate shaft IMS1 connected to the third speed driven gear DP3. Accordingly, the torque of the first input shaft IS1 is transferred to the front wheel output shaft FOS through the third speed drive gear DG3, the third speed driven gear DP3, the first intermediate shaft IMS1, the first transfer drive gear TG1, and the front wheel transfer driven gear FTP.

Meanwhile, because the second synchronizer S2 is operated to the right in the drawing, the second intermediate shaft IMS2 is connected to the fourth speed driven gear DP4. Accordingly, the torque of the second input shaft IS2 is transferred to the rear wheel output shaft ROS through the fourth speed drive gear DG4, the fourth speed driven gear DP4, the second intermediate shaft IMS2, the rear wheel transfer drive gear RTG, and the rear wheel transfer driven gear RTP.

Referring to the above operation, in the four-wheel drive mode second speed, the front wheel FW receives a rotation speed of the front-wheel drive mode third speed, and the rear wheel RW receives a rotation speed of the rear-wheel drive mode second speed.

The overall gear ratio of the front-wheel drive mode third speed is determined based on the gear ratio between the third speed driven gear DP3 and the third speed drive gear DG3, the gear ratio between the first transfer drive gear TG1 and the front wheel transfer driven gear FTP, and the front wheel final reduction ratio (i.e., the gear ratio of the front wheel final reduction gear FFRG).

The overall gear ratio of the rear-wheel drive mode second speed is determined based on the gear ratio between the fourth speed driven gear DP4 and the fourth speed drive gear DG4, the gear ratio between the rear wheel transfer drive gear RTG and the rear wheel transfer driven gear RTP, and the rear wheel final reduction ratio (i.e., the gear ratio of the rear wheel final reduction gear RFRG).

Therefore, gear ratios may be set so that the product of all of the gear ratio between the third speed driven gear DP3 and the third speed drive gear DG3, the gear ratio between the first transfer drive gear TG1 and the front wheel transfer driven gear FTP, and the front wheel final reduction ratio (i.e., the gear ratio of the front wheel final reduction gear FFRG) is equal to the product of all of the gear ratio between the fourth speed driven gear DP4 and the fourth speed drive gear DG4, the gear ratio between the rear wheel transfer drive gear RTG and the rear wheel transfer driven gear RTP, and the rear wheel final reduction ratio (i.e., the gear ratio of the rear wheel final reduction gear RFRG). By such a setting of gear ratios, the rotation speeds of the front wheel FW and the rear wheel RW may become equal to each other the four-wheel drive mode second speed. Specific gear ratios may be set by the designer in accordance with the designer's intention and/or design constraints.

Hereinafter, a power transmission apparatus of an electric vehicle according to a second exemplary embodiment of the present disclosure is described in detail with reference to the drawings.

Figure 3:
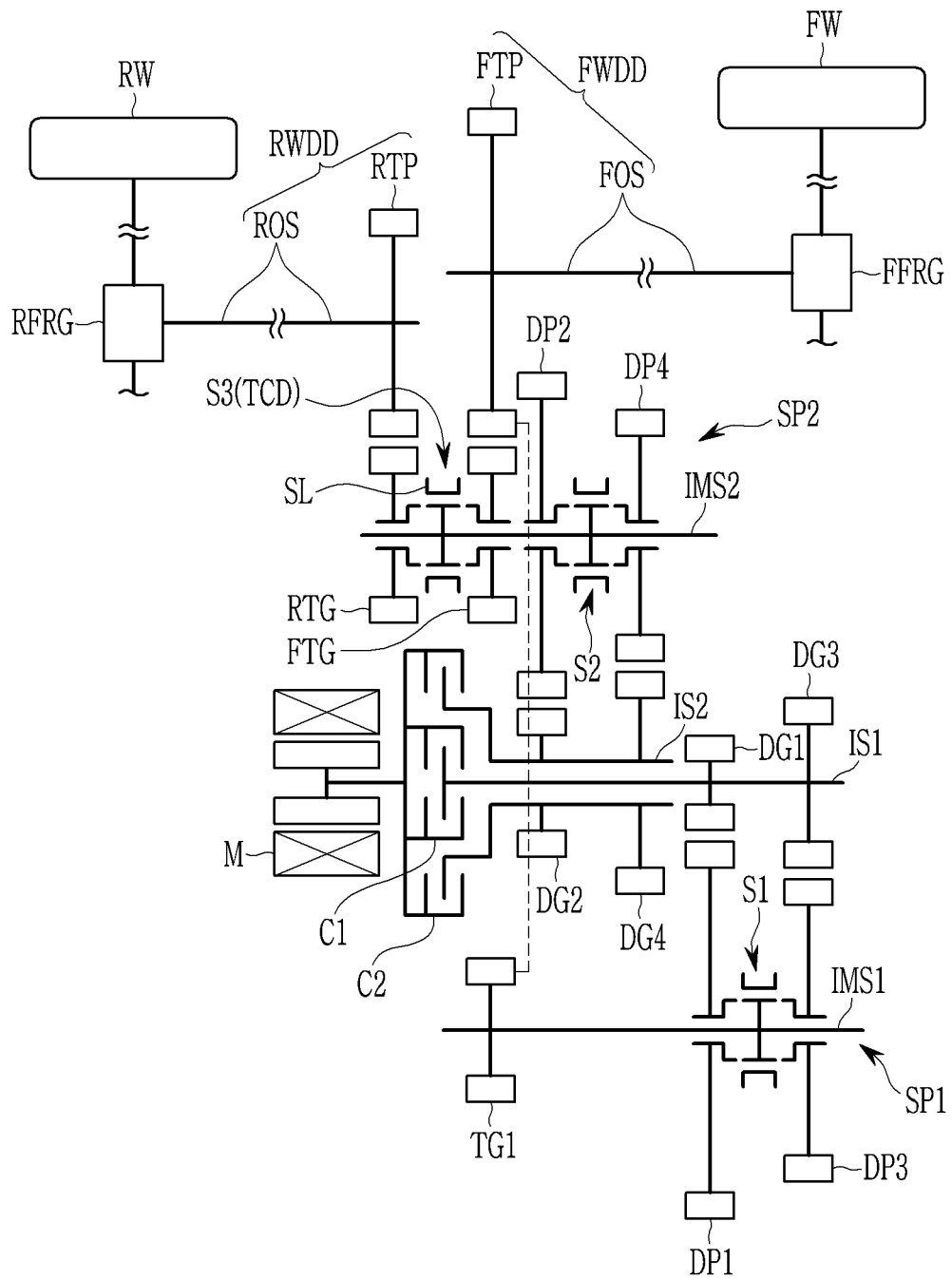
FIG. 3 is a schematic diagram of a power transmission apparatus of an electric vehicle according to a second exemplary embodiment of the present disclosure.

FIG. 3 is a schematic diagram of a power transmission apparatus of an electric vehicle according to a second exemplary embodiment of the present disclosure.

Referring to FIG. 3, in a power transmission apparatus of an electric vehicle according to a second exemplary embodiment of the present disclosure, the mode conversion unit MCU is disposed in an opposite direction of the drive motor M with reference to the second shifting section SP2. In other words, in a power transmission apparatus of an electric vehicle according to a second exemplary embodiment of the present disclosure, the dog clutch S3 is disposed in an opposite direction of the drive motor M with reference to the second synchronizer S2.

In such a configuration, referring to FIG. 3, the rear wheel transfer drive gear RTG and the rear wheel transfer driven gear RTP is disposed in a same direction with the drive motor M with reference to the front wheel transfer drive gear FTG and the front wheel transfer driven gear FTP.

Furthermore, with reference to the dog clutch S3, the rear wheel transfer drive gear RTG is disposed in a same direction with the drive motor M, and the front wheel transfer drive gear FTG is disposed in an opposite direction of the drive motor M.

That is, a power transmission apparatus of an electric vehicle according to a second exemplary embodiment differs from a power transmission apparatus of an electric vehicle according to a first exemplary embodiment in the arrangement of the mode conversion unit MCU (specifically, the arrangement of the dog clutch S3 and front and rear wheel transfer drive and driven gears).

By such a difference, whereas the drive torque for the front wheel FW is transferred in the same direction of the drive motor M in the first exemplary embodiment of the present disclosure, the drive torque for the front wheel FW is transferred in the opposite direction of the drive motor M in the second exemplary embodiment of the present disclosure.

For such a purpose, contrarily to the first exemplary embodiment of the present disclosure, in selectively achieving the front-wheel drive mode and the rear-wheel drive mode (or the four-wheel drive mode) by the operation of the dog clutch S3, the front-wheel drive mode is achieved when the sleeve SL is positioned to the right in the drawing, and the rear-wheel drive mode or four-wheel drive mode is achieved when the sleeve SL is positioned to the left in the drawing, as shown in FIG. 4.

It may be seen that the operation chart of a power transmission apparatus of an electric vehicle according to a second exemplary embodiment shown in FIG. 4 is equal to the operation chart of a power transmission apparatus of an electric vehicle according to a first exemplary embodiment shown in FIG. 2, except for the operation direction of the dog clutch S3.

That is, it may be easily understood that a power transmission apparatus of an electric vehicle according to a second exemplary embodiment of the present disclosure may be operated by the operation chart of FIG. 4 which is similar to FIG. 2, achieving the same drive mode and the same shifting stages in respective drive modes as the first exemplary embodiment of the present disclosure.

According to an exemplary embodiment of the present disclosure, the front-wheel drive mode, the rear-wheel drive mode, and the four-wheel drive mode may be efficiently achieved, and multi-stage shifting may be realized in each drive mode.

Furthermore, according to an exemplary embodiment of the present disclosure, the slip loss of clutches may be minimized in the four-wheel drive mode.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A power transmission apparatus of a vehicle for transferring a torque of a drive motor to at least one of a front wheel and a rear wheel of the vehicle, the power transmission apparatus comprising:
   a motor shaft fixedly connected to the drive motor and configured to receive the torque of the drive motor;
   a first input shaft disposed on a same axis with the motor shaft and selectively connectable to the motor shaft;
   a second input shaft formed in a hollow shaft, coaxially disposed with the first input shaft, disposed on a same axis with the motor shaft, and selectively connectable to the motor shaft;
   a front wheel driving device configured to drive the front wheel;
   a rear wheel driving device configured to drive the rear wheel;
   a first shifting section configured to shift a torque of the first input shaft and selectively transmit the shifted torque of the first input shaft to the front wheel driving device;
   a second shifting section configured to shift a torque of the second input shaft and selectively output the shifted torque of the second input shaft; and
   a mode conversion unit configured to transfer an output torque of the second shifting section to at least one of the front wheel driving device and the rear wheel driving device,_
   wherein the first shifting section includes:
      a first speed drive gear and a third speed drive gear that are fixed on the first input shaft and formed with different radii;
      a first intermediate shaft disposed apart from and in parallel with the first input shaft:
      a first speed driven gear and a third speed driven gear that are rotatably mounted on the first intermediate shaft, and gear-engaged with the first speed drive gear and the third speed drive gear, respectively;
      a first synchronizer configured to selectively connect the first intermediate shaft to the first speed driven gear or the third speed driven gear; and
      a first transfer drive gear configured to transfer an output torque of the first shifting section to the front wheel driving device.

2. The power transmission apparatus of claim 1, wherein the first transfer drive gear is fixed on the first immediate shaft.

3. The power transmission apparatus of claim 1, wherein the second shifting section includes:
   a second speed drive gear and a fourth speed drive gear that are fixed on the second input shaft and formed with different radii;
   a second intermediate shaft disposed apart from and in parallel with the second input shaft;
   a second speed driven gear and a fourth speed driven gear that are rotatably mounted on the second intermediate shaft, and gear-engaged with the second speed drive gear and the fourth speed drive gear, respectively; and
   a second synchronizer configured to selectively connect the second intermediate shaft to the second speed driven gear or the fourth speed driven gear.

4. The power transmission apparatus of claim 1,
   wherein the front wheel driving device includes a front wheel output shaft configured to transfer a drive torque of the front wheel output shaft to the front wheel, and a front wheel transfer driven gear fixed on the front wheel output shaft, and
   wherein the rear wheel driving device includes a rear wheel output shaft configured to transfer a drive torque of the rear wheel output shaft to the rear wheel, and a rear wheel transfer driven gear fixed on the rear wheel output shaft.

5. The power transmission apparatus of claim 1, further including:
   a first clutch configured to selectively connect the motor shaft and the first input shaft; and
   a second clutch configured to selectively connect the motor shaft and the second input shaft.

6. The power transmission apparatus of claim 5, wherein a plurality of front-wheel drive mode shifting stages, a plurality of rear-wheel drive mode shifting stages, and a plurality of four-wheel drive mode shifting stages are achieved according to operations of the first clutch, the second clutch, the first shifting section, the second shifting section, and the mode conversion unit.

7. The power transmission apparatus of claim 1, wherein the mode conversion unit is disposed in a same direction with the drive motor with reference to the second shifting section.

8. The power transmission apparatus of claim 1, wherein the mode conversion unit is disposed in an opposite direction of the drive motor with reference to the second shifting section.

9. A power transmission apparatus of a vehicle for transferring a torque of a drive motor to at least one of a front wheel and a rear wheel of the vehicle, the power transmission apparatus comprising:
- a motor shaft fixedly connected to the drive motor and configured to receive the torque of the drive motor;
- a first input shaft disposed on a same axis with the motor shaft and selectively connectable to the motor shaft
- a second input shaft formed in a hollow shaft, coaxially disposed with the first input shaft, disposed on a same axis with the motor shaft, and selectively connectable to the motor shaft:
- a front wheel driving device configured to drive the front wheel;
- a rear wheel driving device configured to drive the rear wheel;
- a first shifting section configured to shift a torque of the first input shaft and selectively transmit the shifted torque of the first input shaft to the front wheel driving device;
- a second shifting section configured to shift a torque of the second input shaft and selectively output the shifted torque of the second input shaft and
- a mode conversion unit configured to transfer an output torque of the second shifting section to at least one of the front wheel driving device and the rear wheel driving device,
- wherein the mode conversion unit includes:
  - a front wheel transfer drive gear rotatably mounted on an intermediate shaft of the second shifting section and gear-engaged with the front wheel driving device;
  - a rear wheel transfer drive gear rotatably mounted on the intermediate shaft of the second shifting section and gear-engaged with the rear wheel driving device; and
  - a torque connection device configured to selectively connect the intermediate shaft of the second shifting section to one of the front wheel transfer drive gear and the rear wheel transfer drive gear.

10. The power transmission apparatus of claim 9,
- wherein the torque connection device includes a dog clutch disposed on the intermediate shaft of the second shifting section, and including a sleeve configured to operate along the intermediate shaft of the second shifting section, and
- wherein the dog clutch is configured to, according to an operation of the sleeve, connect the intermediate shaft of the second shifting section to the front wheel transfer drive gear, or connect the intermediate shaft of the second shifting section to the rear wheel transfer drive gear.

11. A power transmission apparatus of a vehicle for transferring a torque of a drive motor to at least one of a front wheel and a rear wheel of the vehicle, the power transmission apparatus comprising:
- a motor shaft fixedly connected to the drive motor and configured to receive the torque of the drive motor;
- a first input shaft disposed on a same axis with the motor shaft, selectively connectable to the motor shaft, and fixedly provided with a first speed drive gear and a third speed drive gear having different radii;
- a second input shaft formed in a hollow shaft and coaxially disposed with the first input shaft, disposed on a same axis with the motor shaft, selectively connectable to the motor shaft, and fixedly provided with a second speed drive gear and a fourth speed drive gear having different radii;
- a first intermediate shaft which is disposed apart from and in parallel with the first input shaft, and on which a first speed driven gear and a third speed driven gear gear-engaged with the first speed drive gear and the third speed drive gear are rotatably disposed;
- a second intermediate shaft which is disposed apart from and in parallel with the second input shaft, and on which a second speed driven gear and a fourth speed driven gear gear-engaged with the second speed drive gear and the fourth speed drive gear are rotatably disposed;
- a front wheel output shaft fixedly provided with a front wheel transfer driven gear and configured to drive the front wheel;
- a rear wheel output shaft fixedly provided with a rear wheel transfer driven gear and configured to drive the rear wheel;
- a first transfer drive gear fixed on the first intermediate shaft and gear-engaged with the front wheel transfer driven gear;
- a front wheel transfer drive gear rotatably mounted on the second intermediate shaft and gear-engaged with the front wheel transfer driven gear; and
- a rear wheel transfer drive gear rotatably mounted on the second intermediate shaft and gear-engaged with the rear wheel transfer driven gear.

12. The power transmission apparatus of claim 11, further including:
- a first clutch configured to selectively connect the motor shaft and the first input shaft;
- a second clutch configured to selectively connect the motor shaft and the second input shaft;
- a first synchronizer configured to selectively connect the first intermediate shaft to the first speed driven gear or the third speed driven gear;
- a second synchronizer configured to selectively connect the second intermediate shaft to the second speed driven gear or the fourth speed driven gear; and
- a dog clutch disposed on the second intermediate shaft, and configured to selectively connect the second intermediate shaft to one of the front wheel transfer drive gear and the rear wheel transfer drive gear.

13. The power transmission apparatus of claim 12,
- wherein the dog clutch includes a sleeve configured to operate along the second intermediate shaft; and
- wherein the dog clutch is configured to, according to an operation of the sleeve, connect the second intermediate shaft to the front wheel transfer drive gear, or connect the second intermediate shaft to the rear wheel transfer drive gear.

14. The power transmission apparatus of claim 12, wherein a front-wheel drive mode, a four-wheel drive mode, and a rear-wheel drive mode are achieved according to operations of the first clutch, the second clutch, the first synchronizer, the second synchronizer, and the dog clutch.

15. The power transmission apparatus of claim 14,
- wherein the front-wheel drive mode includes at least four front-wheel drive mode shifting stages;
- wherein the rear-wheel drive mode includes at least two rear-wheel drive mode shifting stages; and wherein the four-wheel drive mode includes at least two four-wheel drive mode shifting stages.

16. The power transmission apparatus of claim 15, wherein, in each of the at least two four-wheel drive mode shifting stages, a rotation speed applied to the front wheel is equal to a rotation speed applied to the rear wheel.

17. The power transmission apparatus of claim 12, wherein the dog clutch is disposed in a same direction with the drive motor with reference to the second synchronizer.

18. The power transmission apparatus of claim 12, wherein the dog clutch is disposed in an opposite direction of the drive motor with reference to the second synchronizer.

* * * * *